United States Patent
Bullard

[11] Patent Number: 5,858,288
[45] Date of Patent: Jan. 12, 1999

[54] METHOD FOR MOLDING EXPANDABLE POLYSTYRENE FOAM ARTICLES

[76] Inventor: Calvin P. Bullard, 467 Mountain Rd., Wilbraham, Mass. 01095

[21] Appl. No.: 966,686

[22] Filed: Nov. 10, 1997

Related U.S. Application Data

[63] Continuation of Ser. No. 683,299, Jul. 18, 1996, abandoned.

[51] Int. Cl.⁶ .................................................. B29C 44/02
[52] U.S. Cl. ............................... 264/53; 264/51; 264/102
[58] Field of Search ................................ 264/51, 53, 101, 264/102

[56] References Cited

U.S. PATENT DOCUMENTS

| | | | |
|---|---|---|---|
| 2,951,260 | 9/1960 | Harrison et al. | 264/53 |
| 3,086,248 | 4/1963 | Culp | 264/53 |
| 3,452,124 | 6/1969 | Knapp | 264/53 |
| 3,809,735 | 5/1974 | Cotterell | 264/53 |
| 3,897,201 | 7/1975 | Belot et al. | 264/53 |
| 4,052,137 | 10/1977 | Pietzner | 264/51 |
| 4,272,469 | 6/1981 | Smith | 264/101 |
| 4,557,881 | 12/1985 | Rabotski | 264/53 |
| 4,682,989 | 7/1987 | Maeda et al. | 55/23 |
| 4,693,856 | 9/1987 | Rubens et al. | 264/53 |
| 4,801,361 | 1/1989 | Bullard et al. | 264/40.6 |
| 4,813,859 | 3/1989 | Bullard et al. | 425/4 R |
| 4,816,199 | 3/1989 | Matz et al. | 264/53 |
| 4,822,542 | 4/1989 | Kuwabara et al. | 264/53 |
| 4,937,271 | 6/1990 | Akamatsu et al. | 521/58 |
| 5,059,376 | 10/1991 | Pontiff et al. | 264/344 |
| 5,160,354 | 11/1992 | Ascough | 264/37 |
| 5,711,905 | 1/1998 | Behl | 264/51 |

FOREIGN PATENT DOCUMENTS

| | | | |
|---|---|---|---|
| 1178203 | 9/1964 | Germany | 264/53 |
| 1 504 360 | 10/1969 | Germany . | |
| 1 504 590 | 10/1969 | Germany . | |
| 26 44 198 | 3/1977 | Germany . | |
| 29 03 495 B1 | 7/1980 | Germany . | |

OTHER PUBLICATIONS

ARCO Chemical, "Expanded Polystyrene Properties", copyright 1989.

*Primary Examiner*—Allan R. Kuhns
*Attorney, Agent, or Firm*—Morgan & Finnegan, LLP

[57] ABSTRACT

An improved process and apparatus for molding expandable polystyrene ("EPS") beads. The process comprises the steps of: (a) introducing the beads into the mold cavity; (b) isolating the mold cavity from the ambient environment; (c) purging the mold cavity of any ambient air and moisture; (d) pulsing steam into the mold cavity among the beads to melt and fuse the beads; (e) pulsing cooling mist into the mold cavity and directly among the melted and fused beads; and (f) removing the melted and fused beads from the mold cavity. The invention also comprises an apparatus for accomplishing this process and a computer program for controlling and directing the apparatus to perform the process.

4 Claims, 6 Drawing Sheets

METHOD FOR MOLDING EXPANDABLE POLYSTYRENE FOAM ARTICLES

This is a continuation of application Ser. No. 08/863,299, filed on Jul. 18, 1996, now abandoned.

FIELD OF THE INVENTION

This invention relates to a time and energy efficient method and apparatus for molding expandable polystyrene into articles of foamed material.

BACKGROUND OF THE INVENTION

The process and apparatus of present invention concern the thermal cycles of molding expandable polystyrene (hereinafter "EPS") into useful articles made of what is commonly called "styrofoam".

Known methods for molding EPS begin with the step of filling a mold with EPS beads. The beads are small hollow polystyrene spheres filled with a gas-forming expansion agent, typically pentane. The molds are usually made of cast aluminum and consist of two halves. Each half is mounted onto a platen to form a "mold assembly" and create a steam cavity behind each side of the mold. Generally, one or both of the platens is moveable to allow separation of the two sides of the mold and thereby facilitate removal of the item being produced.

Once the mold is filled with beads, the next step in EPS molding is a heat cycle to heat the mold and beads to expand and fuse the beads to form the product. The steam cavity behind one half of the mold is filled with steam. This steam is drawn through core vents into the bead-filled mold cavity.

As shown below, the energy required to melt and mold the EPS beads is insignificant compared to the energy used to heat the mold and surrounding steam chest (i.e., the mold/chest).

The heat required to melt and mold a one pound shot of EPS beads is 86 ETUs. The melt temperature of EPS beads is 230° F. and the fusion temperature is 240° F. The specific heat of EPS is 0.24 BTUs/lb–°F. and the latent heat of fusion 50 BTUs/lb. The energy required to melt and mold EPS is given by the following formula.

$$\text{Energy} = \text{Specific Heat} \times \Delta\text{Temperature} + \text{Latent Heat of Fusion} \quad (A)$$

Therefore, the energy required to melt and fuse EPS is at an ambient temperature of 80° F. is 0.24 BTUs/lb–°F.×(230° F.–80° F.)+50 BTUs/lb=86 BTUs/lb.

After the EPS beads were melted and fused, the temperature of the mold and surrounding steam chest had to be reduced from 240° F. to 210° F. to allow for the molded EPS article to be removed from the mold. The heat required to raise the temperature of the mold and surrounding steam chest from the demold temperature of 210° F. to the EPS fusion temperature of 240° F. is on the order of 5,190 BTUs. The mold is typically formed from aluminum which has a specific heat of 0.21 BTU/lb–°F. The mold will be assumed to have a mass of 300 lbs. The energy required to raise the temperature of this mold is given by the following formula.

$$\text{Energy} = \text{Mass of Material} \times \text{Specific Heat} \times \Delta\text{Temperature} \quad (B)$$

Therefore, the energy required to raise the temperature of this aluminum mold from 210° F. to 240° F. is 300 lbs×0.21 BTU/lb–°F.×(240° F.–210° F.)=1,890 BTUs. The surrounding steam chest is typically formed from iron which has a specific heat of 0.11 BTU/lb–°F. The surrounding steam chest will be assumed to have a mass of 1,000 lbs. Employing formula (B) above, the energy required to raise the temperature of this surrounding steam chest from 210° F. to 240° F. to 1,000 lbs.×0.11 BTU/lb–°F.×(240° F.–210° F.)= 3,300 BTUs.

Thus, for each one pound shot of EPS molded by the prior art batch process wherein the mold and the EPS beads were both brought to a temperature of 240° F., the energy required is 5,276 BTUs (i.e., 86+1,890+3,300) per batch.

U.S. Pat. Nos. 4,801,361 and 4,813,859 to Calvin P. Bullard and F. Paul Szubelick disclose an improved method and apparatus for molding EPS. These patents disclose that reductions in energy requirements and length of the heating and cooling cycle can be achieved by concentrating the heat directly on the EPS beads alone, rather than on the combination of the surrounding steam chest, the mold and the EPS beads.

The inventor, Calvin P. Bullard, has continued to perfect and improve the method and apparatus for molding EPS that was jointly conceived by Calvin P. Bullard and F. Paul Szubelick (now deceased) and disclosed in U.S. Pat. Nos. 4,801,361 and 4,813,859. It has been observed by the inventor that the maximum potential reduction in energy requirements provided by the Bullard-Szubelick method and apparatus was not being realized as a result of ambient air and residual moisture remaining in the mold cavity from the previous cooling cycle.

Specifically, during testing conducted in connection with his U.S. Pat. Nos. 4,801,361 and 4,813,859, the inventor, Calvin P. Bullard, observed that while the steam temperature in a 3-inch steam supply pipe at a distance of three (3) feet from the mold/chest was 300°–312° F., the steam temperature within the mold/chest was only 210°–215° F. This wasteful reduction in steam temperature was determined to be attributable to two factors. The first being an unintended loss of superheat, or the desuperheat of the steam supply. As the steam flows from the 3-inch supply pipe into the mold/chest, there is a sudden enlargement of area with an attendant drop in the pressure and temperature of the steam. The reduction in temperature is caused by air and residual moisture in the mold/chest. That is, energy is used to heat the ambient air and residual moisture as well as the EPS beads. In this environment, desuperheating of the steam occurs with an immediate loss of energy. This is believed to be an industry-wide problem. The second factor being inadequate velocity/volume of the steam supplied to the mold/chest due to a poorly designed steampipe system.

It has also been observed that molded EPS articles tend to stick to the mold. This sticking of the molded EPS article to the mold is attributable, in part, to "post-expansion" which is the incomplete fusion of EPS beads and the incomplete extraction of the gas expansion agent from the EPS beads which inhibit proper curing of the EPS article prior to removal from the mold.

It is therefore an object of the present invention to provide a novel method and apparatus for molding expandable polystyrene, which is both energy and time efficient, comprising the steps of isolating the mold/chest and applying a vacuum purge to remove air and residual moisture from the mold/chest.

It is a further object of the present invention to provide a novel method and apparatus for molding expandable polystyrene which reduces the sticking of the molded article to the mold.

Additional objects and advantages of the invention will be set forth, in part, in the description which follows and in part will be apparent from this description, or may be learned by the practice of the invention. The objects and advantages of the invention are realized and obtained by means of the methods, apparatus and the combinations particularly pointed out in the appended claims.

SUMMARY OF THE INVENTION

In accordance with the invention, an improved process and apparatus is provided for molding EPS. The improved process for molding EPS achieves lower energy usage and reduced molding time by heating only the EPS beads, and not the surrounding mold/chest and ambient atmosphere within the mold/chest.

The process of the present invention comprises the steps of (1) introducing EPS beads into a mold cavity; (2) isolating, or sealing off, the mold/chest from the ambient environment; (3) purging ambient air and residual moisture from the mold/chest by applying a vacuum to the mold/chest; (4) pulsing steam into the mold/chest and heating the EPS beads to the melt temperature; (5) maintaining a vacuum within the mold/chest for a duration of time to facilitate the expansion and extraction of the gas expansion agent within the EPS beads; (6) pulsing steam into the mold/chest and heating the EPS to the fusion temperature; (7) cooling the molded EPS article by drawing mist or fog into mold/chest by applying a vacuum to the mold/chest; (8) conditioning the molded EPS article by drawing ambient air into the mold/chest by applying a vacuum to the mold/chest; and (9) removing the molded EPS article from the mold/chest by applying pressurized air across the mold surface.

The present invention also comprises an apparatus for accomplishing this process. The apparatus comprises a two part steam chest having a movable side and a stationary side, each of which includes a mold half. When the two parts of the steam chest are brought together, the mold halves form a mold cavity for containing the EPS beads. A multiplicity of core vents extend through the mold halves so as to allow for the introduction of steam, mist/fog and ambient air into the mold cavity. The apparatus also includes a vacuum pump and tank for applying a vacuum to the mold/chest. The apparatus further includes means for introducing steam into the mold/chest, means for introducing mist or fog into the mold/chest, and means for introducing ambient air into the mold/chest.

The present invention also comprises the use of a computer program for controlling and directing the apparatus to perform the above-described process.

BRIEF DESCRIPTION OF THE DRAWINGS

The invention will be further described, by way of example, with reference to the accompanying drawings, wherein.

DETAILED DESCRIPTION OF THE PREFERRED EMBODIMENTS OF THE INVENTION

The process or method of the present invention involves the application of a vacuum during the batch molding process of EPS articles in order to minimize the amount of heat used during the molding process and to minimize the post-expansion of the molded EPS article. The invention also includes the apparatus for accomplishing the process and the computer program for controlling the process and apparatus.

Figure 1:
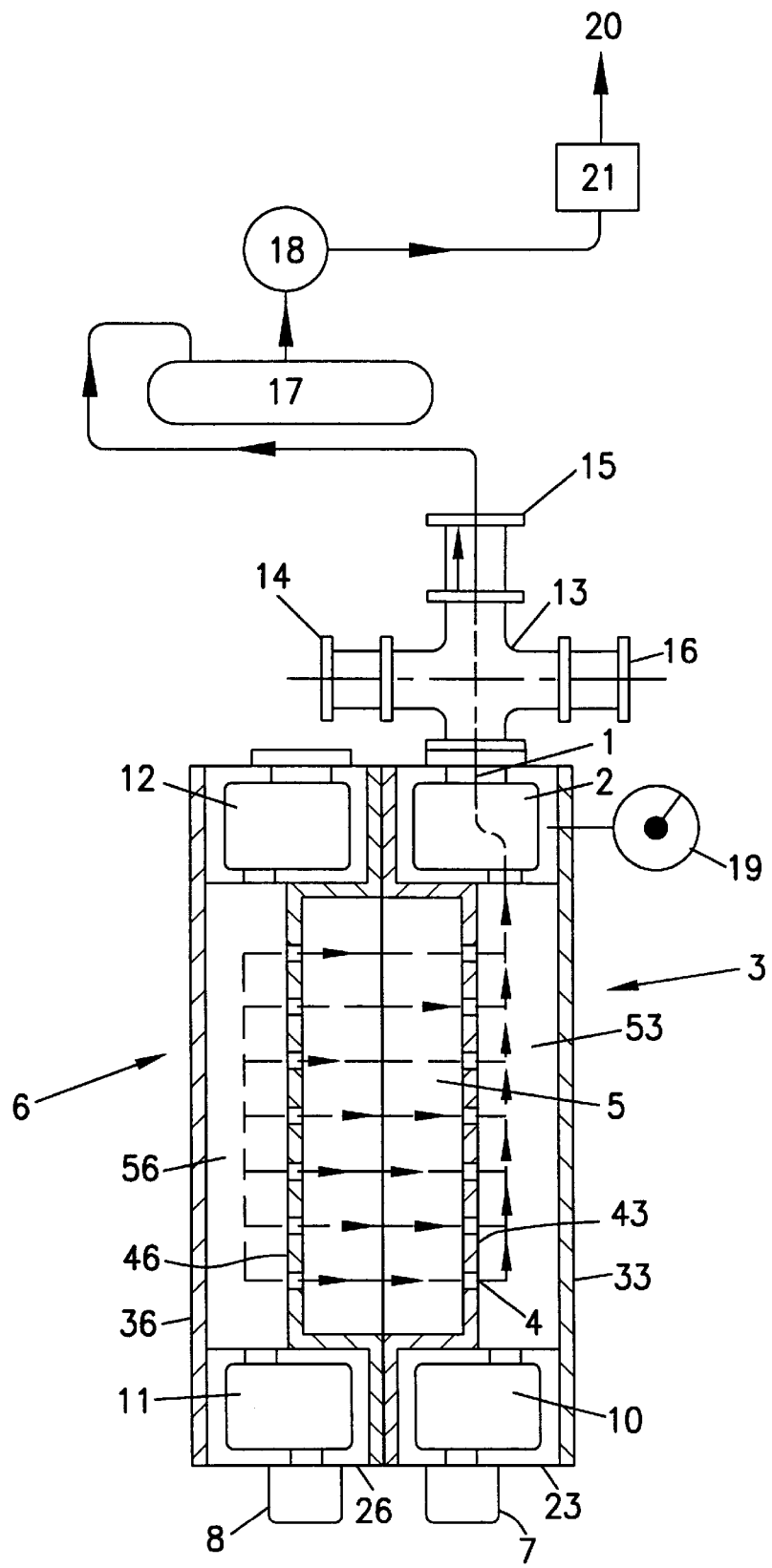
FIG. 1 is a schematic representation of the apparatus and process of the present invention showing the isolation of the mold/chest application of a vacuum to purge the mold/chest in preparation for melting of EPS beads.
Figure 2:
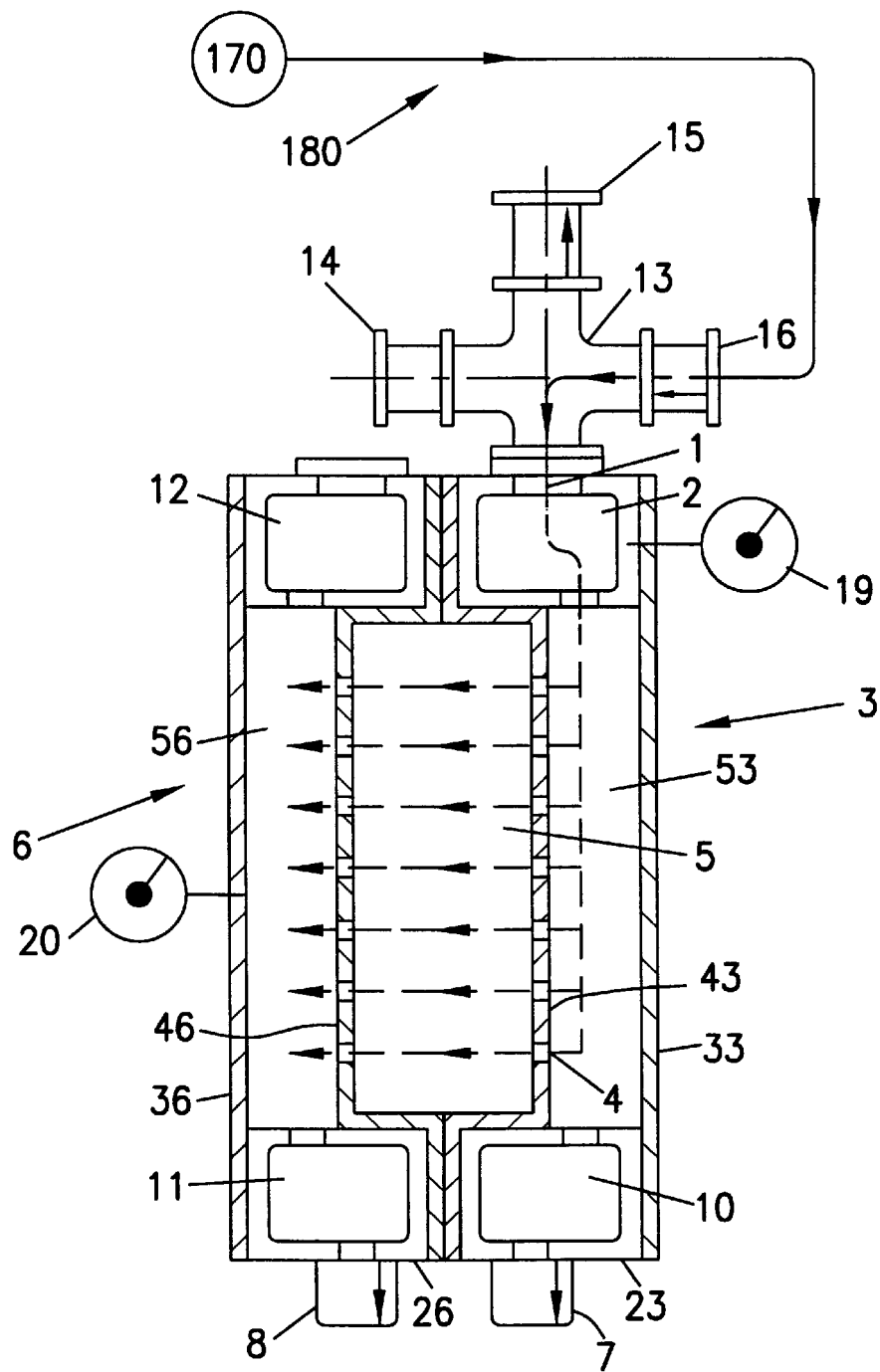
FIG. 2 is a schematic representation of the apparatus and process of the present invention showing the "in vacuo" steam pulse to the mold/chest.

Referring to FIGS. 1 and 2, the preferred embodiment of the molding apparatus of the present invention comprises a movable chest 6 and a stationary chest 3. The movable chest 6 comprises a platen 26 having a backplate 36, an inflow manifold 12 along the top thereof, an outflow manifold 11 along the bottom thereof, and a mold surface 46 mounted to the platen 26 and extending from the inflow manifold 12 to the outflow manifold 11. When the mold surface 46 is mounted to the platen 26, a flow passage 56 extending from the inflow manifold 12 to the outflow manifold 11 is formed and places the inflow manifold 12 and outflow manifold 11 in fluid communication. The outflow manifold 11 includes a drain valve 8 which allows for the drainage of fluid from the platen 26.

Figure 4:
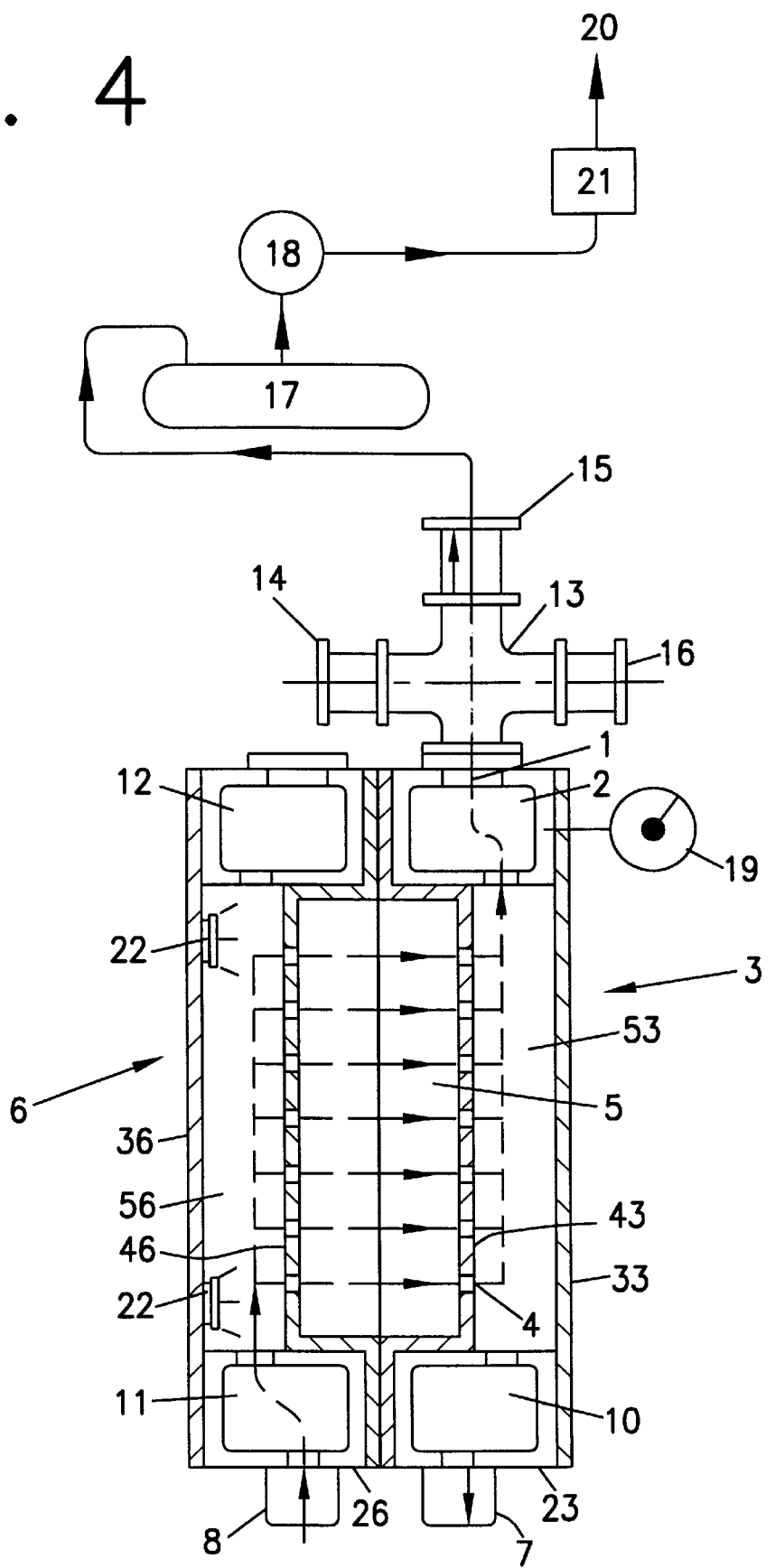
FIG. 4 is a schematic representation of the apparatus and process of the present invention showing the change-of-state cooling of the molded EPS article.

Referring to FIG. 4, fog nozzles 22 are mounted on backplate 36 within the flow passage 54. Water is supplied to the fog nozzles in a conventional manner (not shown in figures). The orifices in the fog nozzles 22 are sized so that water flowing out of the fog nozzles 22 into the flow passage 54 will be in the form of fog or mist.

The stationary chest 3 is essentially a mirror image of the movable chest 6. The stationary mold chest 3 comprises a platen 23 having a backplate 33, an inflow manifold 2 along the top thereof, an outflow manifold 10 along the bottom thereof, and a mold surface 43 mounted to the platen 23 and extending from the inflow manifold 2 to the outflow manifold 10. When the mold surface 43 is mounted to the platen 23, a flow passage 53 extending from the inflow manifold 2 to the outflow manifold 10 is formed and places the inflow manifold 2 and the outflow manifold 10 in fluid communication. The outflow manifold 10 includes a drain valve 7 which allows for the drainage of fluid from the platen 23.

When the movable mold chest 6 and the stationary mold chest 3 are brought together, mold surfaces 46 and 43 form a mold/chest 5. The volume of the mold/chest 5 may be about 27 cubic feet. The mold surfaces 43 and 46 each have a multiplicity of core vents 4 extending therethrough so as to place the mold/chest 5 in fluid communication with the flow passages 54 and 53 of movable chest 6 and stationary chest 3, respectively. The mold/chest 5 is to be filled with EPS beads. The chest 6 is movable so that when the batch molding process is completed, mold chest 6 can be separated from stationary chest 3 to allow for the removal of the molded article 99 formed from the EPS beads (see FIG. 6).

A cross-connection 13 as affixed to the top of the stationary mold chest 3. The first of the four openings of the cross-connection 13 is aligned with the in-flow opening 1 in the inflow manifold 2. A directional control valve 14 is affixed to the second opening of the cross-connection 13 and controls the flow of pressurized or compressed air into the inflow manifold 2 and into the mold/chest 5 via the multiplicity of core vents 4 in the mold surfaces 43 and 46.

A directional control valve 16 is affixed to the third opening of the cross-connection 13 and controls the flow of steam from a conventional steam boiler/generator 170 (see FIGS. 2 and 3), via steam supply piping system 180, into the inflow manifold 2 and into the mold/chest 5 via the multiplicity of core vents 4 in the mold surfaces 43 and 46.

A directional control valve 15 is affixed to the fourth opening of the cross-connection 13 and controls the negative pressure within the mold/chest. The molding apparatus includes a vacuum tank 17 and a vacuum pump 18. The vacuum tank 17 and vacuum pump 18 are in fluid communication with the directional control valve 15. When the vacuum pump 18 is operating and the directional control valve 15 is opened, a vacuum is applied to the inflow manifold 2 and to the mold/chest 5 via the multiplicity of core vents 4 in the mold surfaces 43 and 46. A vacuum gage 19 measures the vacuum within the inflow manifold 2. The vacuum pump 18 discharges through a scrubber/burner 21, which complies with OSHA specifications, and then to the environment 20.

The preferred embodiment of the process of the present invention will now be described. While the process will be described with reference to the above-described apparatus, the process of the present invention is not limited in any by the structure of the above-identified apparatus.

First, referring to FIG. 1, the movable chest 6 and the stationary chest 3 are brought together so that the mold surfaces 46 and 43 form a mold/chest 5. All valves, vents and drains are closed. This step is referred to as "isolation". The mold/chest 5 is isolated from the ambient environment 20.

Second, the EPS beads are introduced into the mold/chest 5 in a conventional manner. In a preferred embodiment, a relatively weak vacuum may be applied to the mold/chest 5 to assist in the filling of the mold/chest 5 with EPS beads.

Third, any ambient air and residual moisture remaining in the mold/chest 5, movable chest 6 and stationary chest 3 from a prior cooling cycle, is removed therefrom. This step is referred to as the "vacuum purge" of the mold/chest. The thermal mass of the ambient air within the 27 cubic foot mold/chest 5 is 90.4 BTU. In a preferred embodiment, a vacuum is utilized to remove any ambient air and residual moisture. Referring to FIG. 1, such a vacuum is applied, in the context of the above-described apparatus, by closing the directional control valves 14 and 16 and drain valves 7 and 8, operating the vacuum pump 18 and opening the directional control valve 15. The vacuum reduces the internal pressure of the mold/chest 5 to 10" mercury (−5 psig). The vacuum should be applied for about 2.0 seconds in order to ensure the removal of any ambient air and residual moisture from a previous cycle. After about 2.0 seconds has elapsed, the directional control valve 15 is closed. The ambient air, with its thermal mass of 90.4 BTU, is thereby removed from the mold/chest 5.

Fourth, steam is introduced into the mold/chest 5 in a controlled manner and heats the EPS beads to the melt temperature of 230° F. Referring to FIG. 2, in the context of the above-described apparatus, the steam is supplied to the mold/chest 5 by opening the directional control valve 16 and maintaining closed the directional control valves 14 and 15 and drain valves 7 and 8. As a result of the residual vacuum from the previous step, the steam is drawn from the inflow manifold 2 into the mold/chest 5 via the multiplicity of core vents 4 in the mold surfaces 43 and 46.

By way of example only, the steam introduced into the mold/chest 5 may be a 3 cubic foot pulse of steam may be at 25 psig. It is readily calculated that the pressure of this steam pulse is reduced to 2.8 psig upon introduction into the 27 cubic foot mold/chest 5. It is known that $P_1V_1=P_2V_2$. Equating $P_1V_1$ of the steam pulse to the $P_2V_2$ of the steam in the mold/chest 5 yields (25 p.s.i.g.) (3 ft$^3$)=$P_2$ (27 ft$^3$)

$P_2$=2.8 psig

The resulting pressure in mold/chest 5 is the sum of the vacuum pressure and the pressure of the steam.

$PV=(P_1+P_2) V$ $P=P_1+P_2$ $P=-5$ psig+2.8 psig=−2.2 psig.

When the pressure of the steam pulse is reduced from 25 psig to 2.8 psig, the released superheat of the steam pulse heats the EPS beads only.

In a preferred embodiment, the pulse of steam is at a pressure of 40–60 psig, which is necessary for achieving the necessary temperature for melting and fusing the EPS beads.

The size of the piping delivering the steam from the steam boiler/generator to the mold/chest 5 affects the velocity and the pressure of the steam. The velocity and pressure of steam flowing through a pipe will be reduced by a proportionality constant known as the K factor. For instance, a 3" pipe having a K factor of 0.5 will reduce the steam velocity and pressure by 50%. The K factors for various pipes are listed in Leonard's Manual on Saturated Steam Piping. The inventor has found that if the K factors for the components of the steam supply piping system for supplying steam to the molding apparatus are not taken into account, the pressure and velocity of the steam within the mold/chest 5 may be inadequate to melt and fuse the EPS beads.

Figure 3:
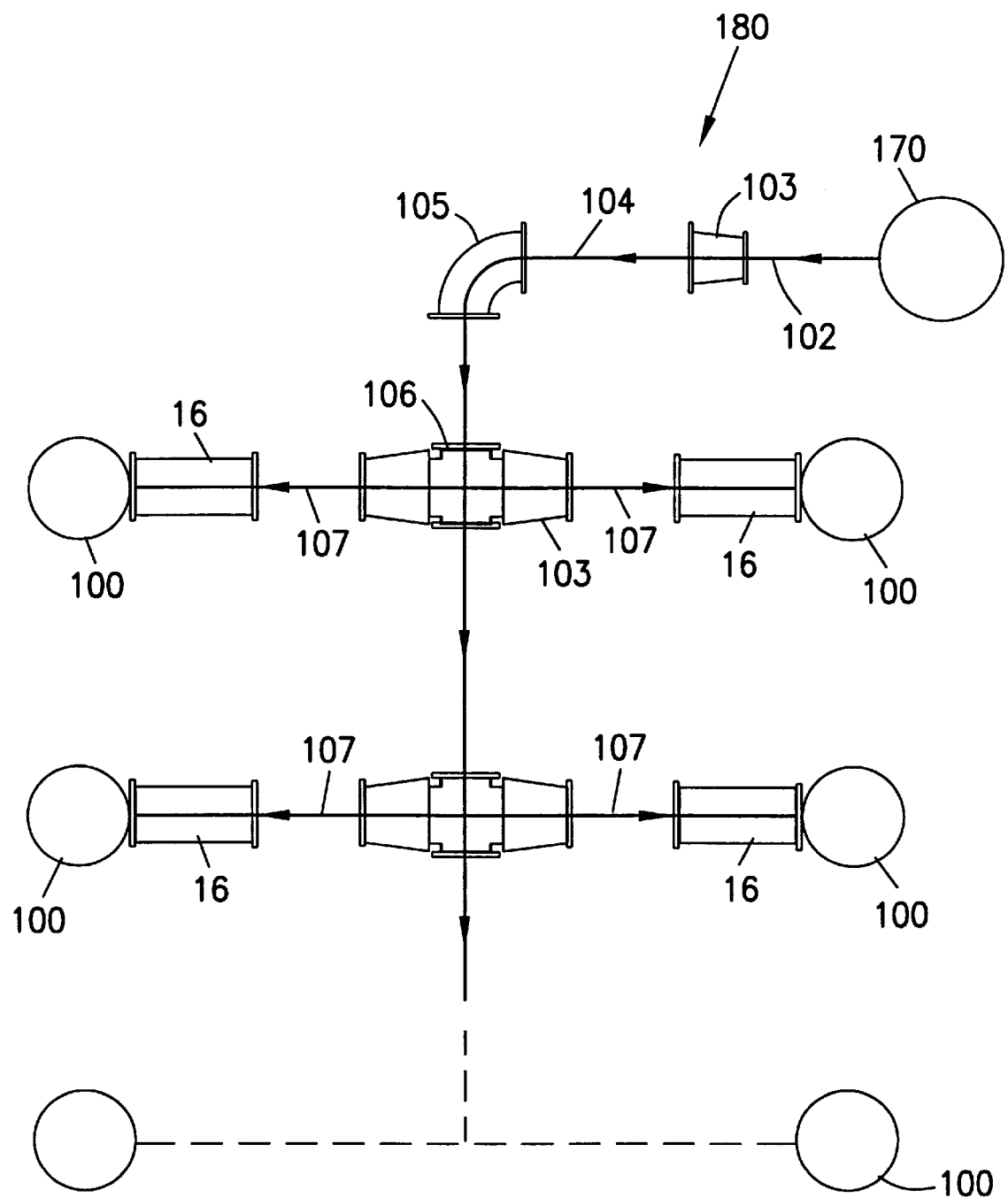
FIG. 3 is a schematic representation of the steam supply piping system for supplying steam to a plurality of molding apparatuses.

FIG. 3 depicts a steam supply piping system 180 for supplying steam to a plurality of molding apparatuses 100. As a result of the reduced energy requirements for the novel molding apparatus 100 and process, just one (1) steam boiler/generator may be able to supply the requisite steam for up to 24 molding apparatuses 100. The steam boiler/generator 170 is conventional and well known in the art. By way of example only, the steam boiler/generator 170 is rated at 150 horse power. The steam supply piping system 180, which transports steam from the steam boiler generator 170 to the directional control valve 16 affixed to the cross-connection 13 for each molding apparatus 100, comprises: a 3" outlet pipe 102, a 4"×3" reducer 103, 4" main pipe 104, a 4" large radius elbow 105, a 4" cross-connection 106 for supplying steam to a plurality of molding apparatuses 100, and 3" branch pipe 107 for connecting the 4" cross-connection 106 to the directional control valve 16.

In a preferred embodiment, the steam boiler/generator 170 is dedicated to supplying steam to the plurality of molding apparatuses 100 only. Consequently, the temperature, pressure and velocity of the steam supplied to the mold/chest 5 can be adjusted to optimize the energy savings realized by the improved apparatus and process.

Fifth, the EPS is maintained at a temperature of 230° F. and under the negative gauge pressure of the residual vacuum from the third step for a duration of time, preferably about 0.7 seconds. A negative gauge pressure within the mold/chest will enhance the expansion and extraction of the pentane gas within the EPS beads. The pentane gas within the EPS beads is typically at indeterminate pressure. When the pressure of the surrounding mold/chest is greater than the pressure of the pentane within the EPS bead there is a net force compressing the EPS bead. On the other hand, when the pressure within the surrounding mold/chest is less than the pressure of the pentane within the EPS bead, as is the case when there is a vacuum in the mold/chest, there is a net force expanding the EPS bead. This net force expanding the EPS bead results in a breach of the EPS bead surface and the extraction of pentane from within the EPS bead. Since pentane is a hazardous material, a scrubber/burner 21 is provided to handle the extracted pentane. After the pentane has been extracted, the remaining gaseous material is exhausted to the ambient environment 20.

Sixth, steam is again introduced into the mold/chest 5 in a controlled manner and heats the EPS to the fusion temperature of 240° F. In the context of the above-described apparatus, the steam is introduced into the mold/chest 5 in the same manner as described above in the fourth step.

Seventh, the molded EPS article is cooled by the introduction of a mist or fog into the mold/chest 5. In a preferred embodiment, the mist or fog is drawn into the mold/chest 5 by the application of a vacuum. Referring to FIG. 4, in the context of the above-described apparatus, the most or fog is supplied to the flow passage 54 in the movable mold chest 6 by supplying water to the fog nozzles 22. The mist or fog is drawn through the mold/chest 5 via the multiplicity of core vents 4 in the mold surfaces 43 and 46, by applying a vacuum. The vacuum is applied by closing the directional control valves 14 and 16, operating the vacuum pump 18 and opening the directional control valve 15. Drain valves 7 and 8 are opened to facilitate the flow of the mist or fog through the mold/chest 5.

The heat of the molded EPS article is transferred to the mist or fog thereby causing the mist or fog to change its state to a gas. This "change-of-state" cooling is very effective and requires a minimal amount of mist or fog. Preferably, when the temperature of the molded EPS article has been reduced to about 210° F., the water flow to the fog nozzles 22 is terminated, thereby terminating the flow of mist or fog into the mold/chest 5.

Figure 5:
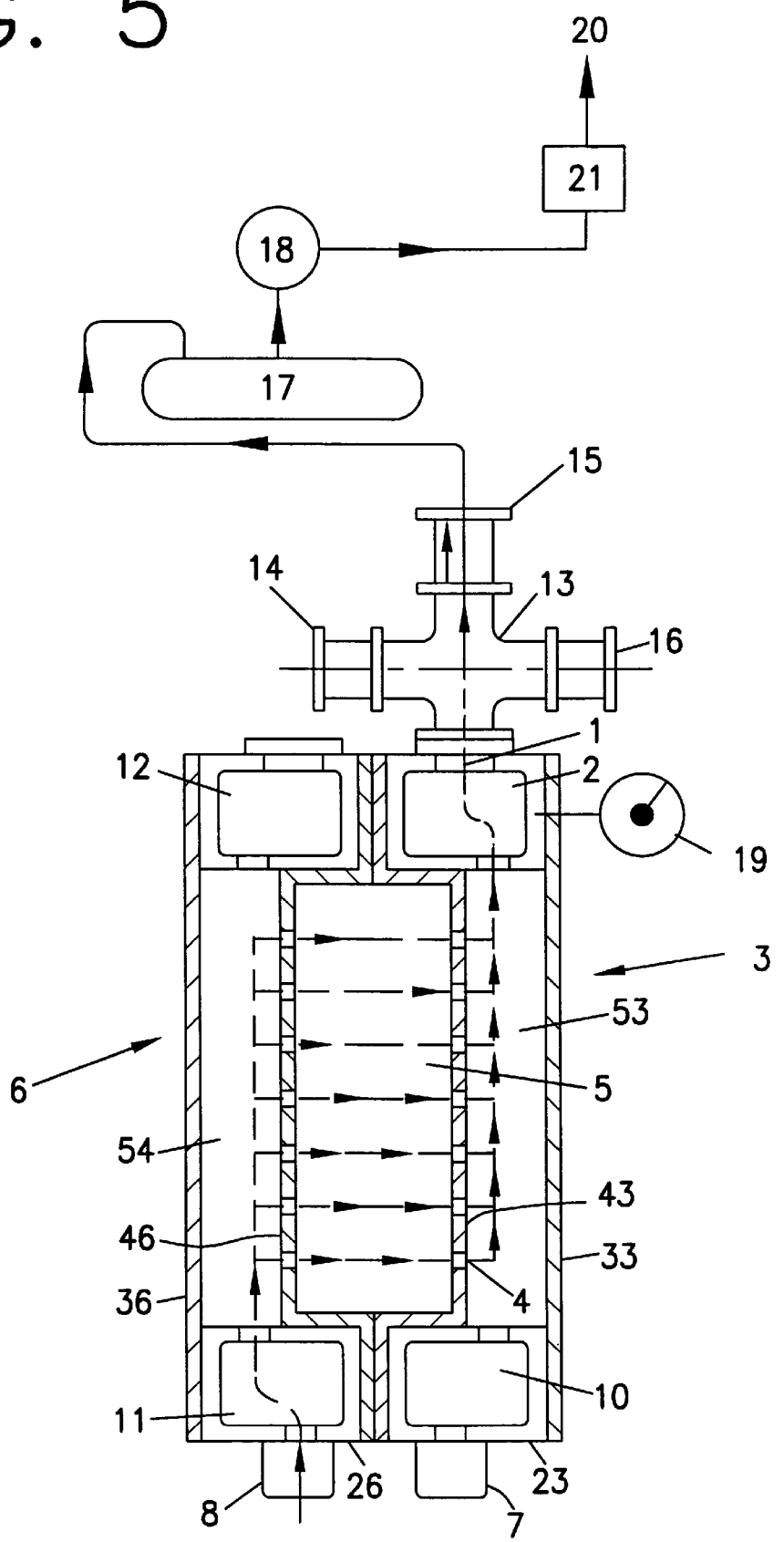
FIG. 5 is a schematic representation of the apparatus and process of the present invention showing the conditioning of the molded EPS article by ambient air as well as mold preparation for next cycle in particular, bead fill.

Eighth, the molded EPS article is cured and conditioned by the flow of ambient air through the mold/chest 5. In a preferred embodiment, the ambient air is drawn into the mold/chest 5 by the application of a vacuum. Referring to FIG. 5, in the context of the above-described apparatus, the ambient air is provided by opening the drain valves 7 and 8. The ambient air is drawn through the mold/chest 5 via the multiplicity of core vents 4 in the mold surfaces 43 and 46, by applying a vacuum. The vacuum is applied by closing the directional control valves 14 and 16, operating the vacuum pump 18 and opening the directional control valve 15. The vacuum should be applied for about 2.7 seconds. After about 2.7 seconds has elapsed, the directional control valve 15 is closed.

Figure 6:
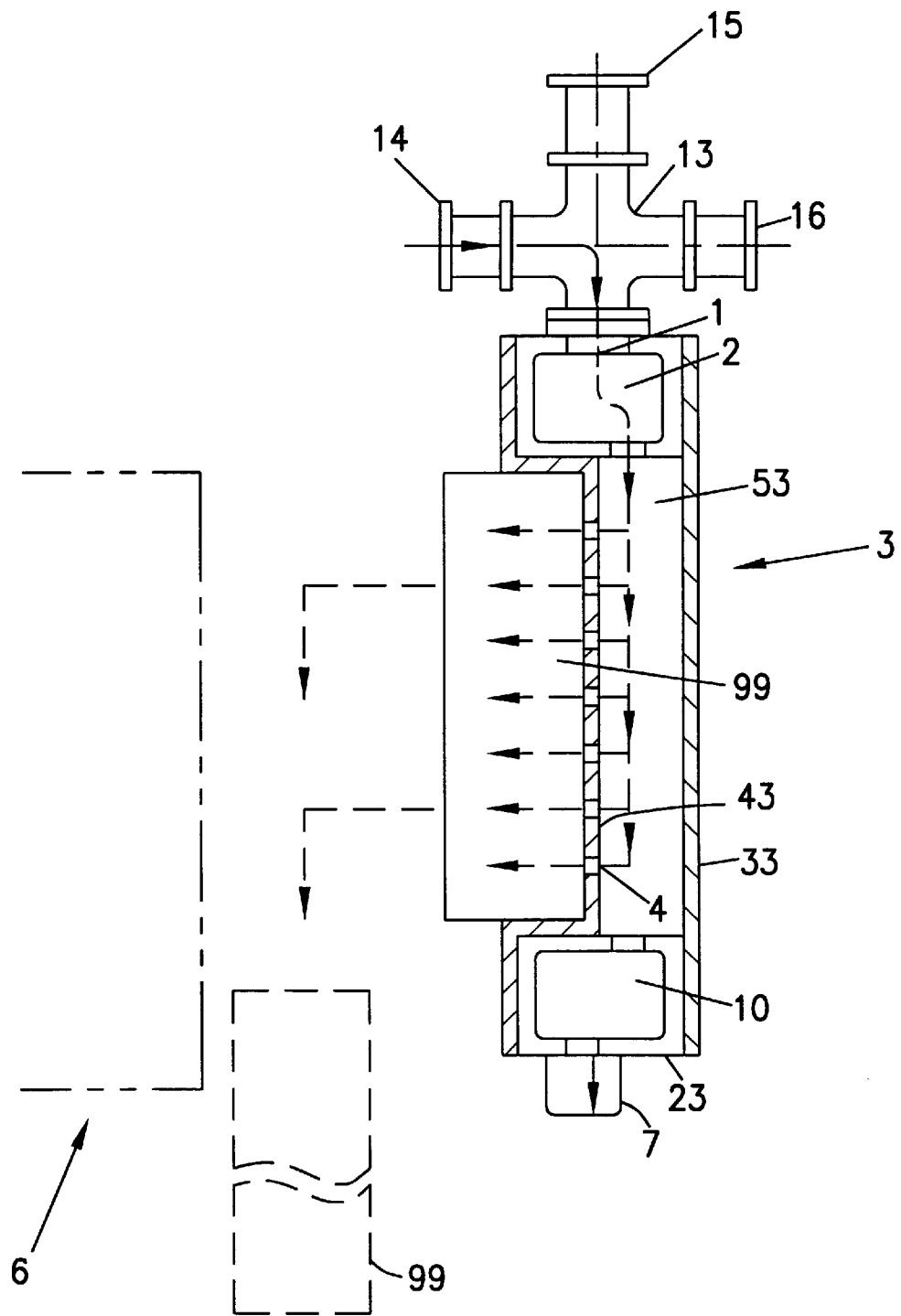
FIG. 6 is a schematic representation of the apparatus and process of the present invention showing the removal of the molded EPS article from the mold.

Ninth, the molded EPS article is removed from the mold. In a preferred embodiment, the removal of the molded EPS article from the mold is facilitated by the application of compressed air across the mold surface. Referring to FIG. 6, in the context of the above-described apparatus, the movable mold chest 6 is separated from the stationary mold chest 3 by a distance sufficient to allow for the removal of the molded EPS article. The directional control valves 15 and 16, and drain valve 7 are closed. The directional control valve 14 is opened allowing compressed air at a maximum pressure of 80 psig to flow into the inflow manifold 2 and the flow passage 53 such that the molded EPS article 99 is subjected to compressed air at a pressure of 10 psig. The compressed air then acts through the multiplicity of core vents 4 in the mold surface 43 to apply a force against the molded EPS article which dislodges the molded EPS article 99 from the mold surface 43.

The following table summarizes the steps comprising the steps of the improved process for molding EPS

| Event | Time (Seconds) | Remark/Function |
|---|---|---|
| Dry Phase | | |
| 1. Close Mold | 2.5 | Close - moving side. All valves, vents and drains - closed. |
| 2. Dwell | 0.1 | Allows valves, etc. time to activate |
| 3. Fill mold/chest with EPS beads | 4.5 | Vacuum assisted bead fill All other valves, vents and drains - closed. Pre-heat beads with radiant energy, mold temperature @ 200± degrees F.. |
| Production Phase | | |
| 4. Isolation "On" | 0.1 | Dwell |
| 5. Vacuum purge (see FIG. 1) | 2.0 | Vacuum "on" stationary side, steam "off", air "off, all drains closed. |
| 6. Steam Pulse (see FIG. 2) | | |
| (a). Steam pulse-melt to 230 degrees F. | 0.3 | Steam "on" - stationary side vacuum "off", all drains and vents "closed." |
| (b). Dwell - gas expansion and gas extraction | 0.7 | Allows ideal conditions (temperature, pressure, time) for degas of product. |
| (c). Steam pulse-fusion to 240 degrees | 0.3 | Steam "on" - stationary side, vacuum "off", air "off", all drains and vents "closed." |
| (d). Dwell - stabilize and shape | 0.7 | Steam "off", vacuum "off", all drains and vents "closed." Conditions product and mold. |
| Dry Phase | | |
| 7. Isolation "off" | 0.1 | Dwell |
| 8. Cool (change-of-state cooling) | | |
| (a) Fog/mist to 210 degrees F. (see FIG. 4) | 0.3 | Vacuum "on" - stationary side, fog "on" moving side, drains "closed" - stationary side, drains "open" - moving side and all vents "closed." |
| (b) Cure and Conditioning to 180 degrees F. (see FIG. 5) | 2.7 | Vacuum "on" - stationary side, drains "closed" - stationary side, (product hot and dry), drains "open" - moving side and all vents "closed." |
| 9. Mold Open/Air Eject (see FIG. 6) | 1.0 | Vacuum "on" - moving side All other valves and vents closed. Eject molded piece by introducing pressurized air across mold surface. |
| | 1.5 | Air "on" - stationary side All other valves closed. |
| 10. Dwell | 0.1 | |
| Total: | 16.9 | |

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims. The method and process of the invention may be applicable to other expanding polymer and molding processes as is presently or prospectively known in the art. For example, expandable polyethylene beads may be substituted for the polystyrene beads of the invention. Thus, it is intended that the present invention cover the modifications and variations of this invention provided that they come within the scope of the appended claims and their equivalents.

What is claimed is:

1. A method of molding thermoplastic polymer beads in the form of hollow spheres filled with a gas-forming expansion agent to form articles of foamed material in a mold having a mold cavity, the thermoplastic polymer having a melting temperature and a fusion temperature, comprising the following steps:
   (a) first, introducing the beads into the mold cavity;
   (b) second, isolating the mold cavity from the ambient environment;
   (c) third, purging the mold cavity of any ambient air and moisture by applying a vacuum to the mold cavity;
   (d) fourth, maintaining the mold cavity under vacuum pressure, pulsing steam into the mold cavity among the beads and heating the beads to the melting temperature of the thermoplastic polymer, wherein steps (a)–(c) are performed in sequence prior to commencing this step;
   (e) maintaining the beads at the melting temperature of the thermoplastic polymer and maintaining the mold cavity under vacuum pressure to facilitate the expansion and extraction of the gas-forming expansion agent from the beads;
   (f) pulsing steam into the mold cavity among the melted beads and heating the melted beads to the fusion temperature of the thermoplastic polymer;
   (g) pulsing cooling mist into the mold cavity and directly among the melted and fused beads;
   (h) conditioning the melted and fused beads by drawing ambient air into the mold cavity and directly among the melted and fused beads; and
   (i) removing the melted and fused beads from the mold cavity.

2. A method of molding thermoplastic polymer beads in the form of hollow spheres filled with a gas-forming expansion agent to form articles of foamed material in a mold having a mold cavity, the thermoplastic polymer having a melting temperature and a fusion temperature, comprising the following steps:
   (a) first, introducing the beads into the mold cavity;
   (b) second, isolating the mold cavity from the ambient environment;
   (c) third, purging the mold cavity of any ambient air and moisture by applying a vacuum to the mold cavity;
   (d) fourth, maintaining the mold cavity under vacuum pressure, pulsing steam into the mold cavity among the beads and heating the beads to the melting temperature of the thermoplastic polymer, wherein steps (a)–(c) are performed in sequence prior to commencing this step;
   (e) maintaining the beads at the melting temperature of the thermoplastic polymer and maintaining the mold cavity under vacuum pressure to facilitate the expansion and extraction of the gas-forming expansion agent from the beads;
   (f) extracting the gas-forming expansion agent from the beads and scrubbing the gas-forming expansion agent;
   (g) pulsing steam into the mold cavity among the melted beads and heating the melted beads to the fusion temperature of the thermoplastic polymer;
   (h) pulsing cooling mist into the mold cavity and directly among the melted and fused beads;
   (i) conditioning the melted and fused beads by drawing ambient air into the mold cavity and directly among the melted and fused beads; and
   (j) removing the melted and fused beads from the mold cavity.

3. A method of molding thermoplastic polymer beads in the form of hollow spheres filled with a gas-forming expansion agent to form articles of foamed material in a mold having a mold cavity, the thermoplastic polymer having a melting temperature and a fusion temperature, comprising the following steps:
   (a) first, introducing the beads into the mold cavity;
   (b) second, isolating the mold cavity from the ambient environment;
   (c) third, purging the mold cavity of any ambient air and moisture by applying a vacuum to the mold cavity;
   (d) fourth, maintaining the mold cavity under vacuum pressure, pulsing steam into the mold cavity among the beads and heating the beads to the melting temperature of the thermoplastic polymer, wherein steps (a)–(c) are performed in sequence prior to commencing this step;
   (e) maintaining the beads at the melting temperature of the thermoplastic polymer and maintaining the mold cavity under vacuum pressure to facilitate the expansion and extraction of the gas-forming expansion agent from the beads;
   (f) pulsing steam into the mold cavity among the melted beads and heating the melted beads to the fusion temperature of the thermoplastic polymer;
   (g) conditioning the melted and fused beads by drawing ambient air into the mold cavity and directly among the melted and fused beads; and
   (h) removing the melted and fused beads from the mold cavity.

4. A method of molding thermoplastic polymer beads in the form of hollow spheres filled with a gas-forming expansion agent to form articles of foamed material in a mold having a mold cavity, the thermoplastic polymer having a melting temperature and a fusion temperature, comprising the following steps:
   (a) first, introducing the beads into the mold cavity;
   (b) second, isolating the mold cavity from the ambient environment;
   (c) third, purging the mold cavity of any ambient air and moisture by applying a vacuum to the mold cavity;
   (d) fourth, maintaining the mold cavity under vacuum pressure, pulsing steam into the mold cavity among the beads and heating the beads to the melting temperature of the thermoplastic polymer, wherein steps (a)–(c) are performed in sequence prior to commencing this step;
   (e) maintaining the beads at the melting temperature of the thermoplastic polymer and maintaining the mold cavity under vacuum pressure to facilitate the expansion and extraction of the gas-forming expansion agent from the beads;
   (f) extracting the gas-forming expansion agent from the beads and scrubbing the gas-forming expansion agent;
   (g) pulsing steam into the mold cavity among the melted beads and heating the melted beads to the fusion temperature of the thermoplastic polymer;
   (h) conditioning the melted and fused beads by drawing ambient air into the mold cavity and directly among the melted and fused beads; and
   (i) removing the melted and fused beads from the mold cavity.

* * * * *